Jan. 3, 1961     M. A. D'AMATO     2,967,056
MATERIAL SPREADERS FOR DUMP TRUCKS
Filed Oct. 28, 1955     4 Sheets-Sheet 2
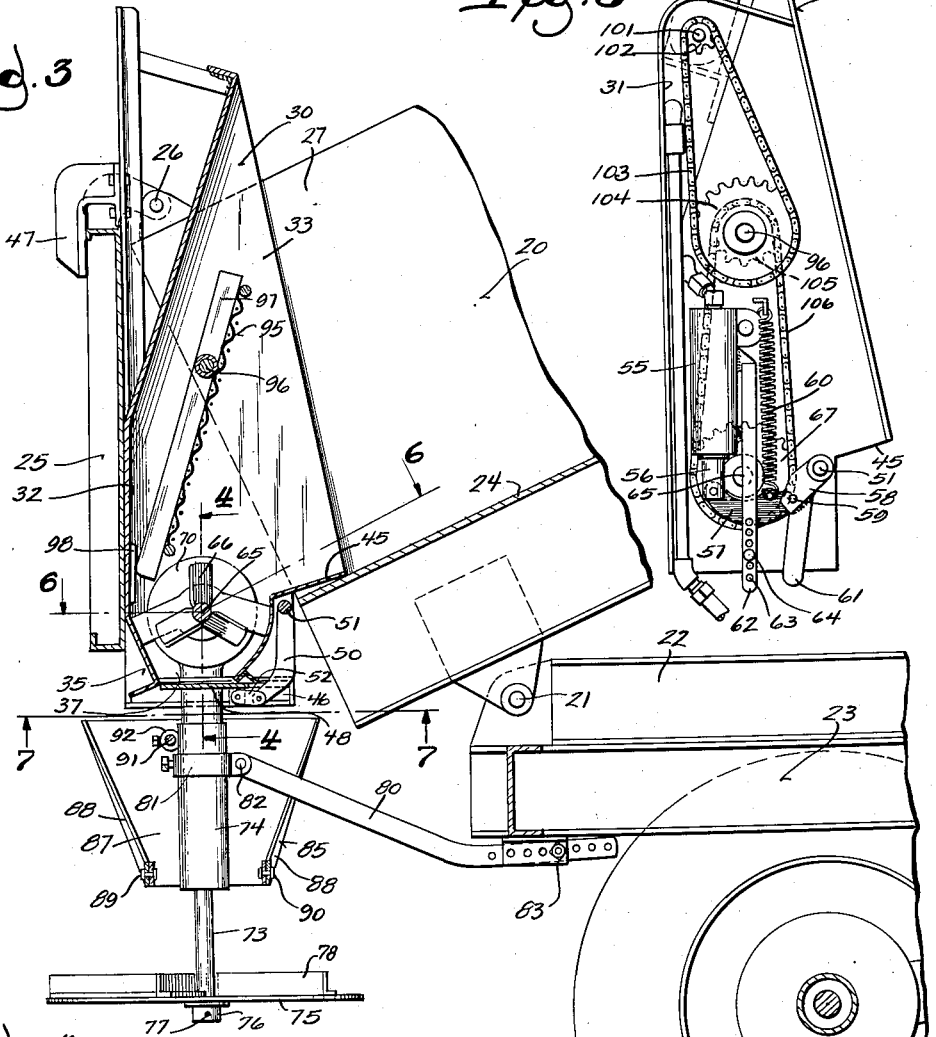
INVENTOR.
MICHAEL A. D'AMATO
BY
Wheeler, Wheeler + Wheeler
ATTORNEYS

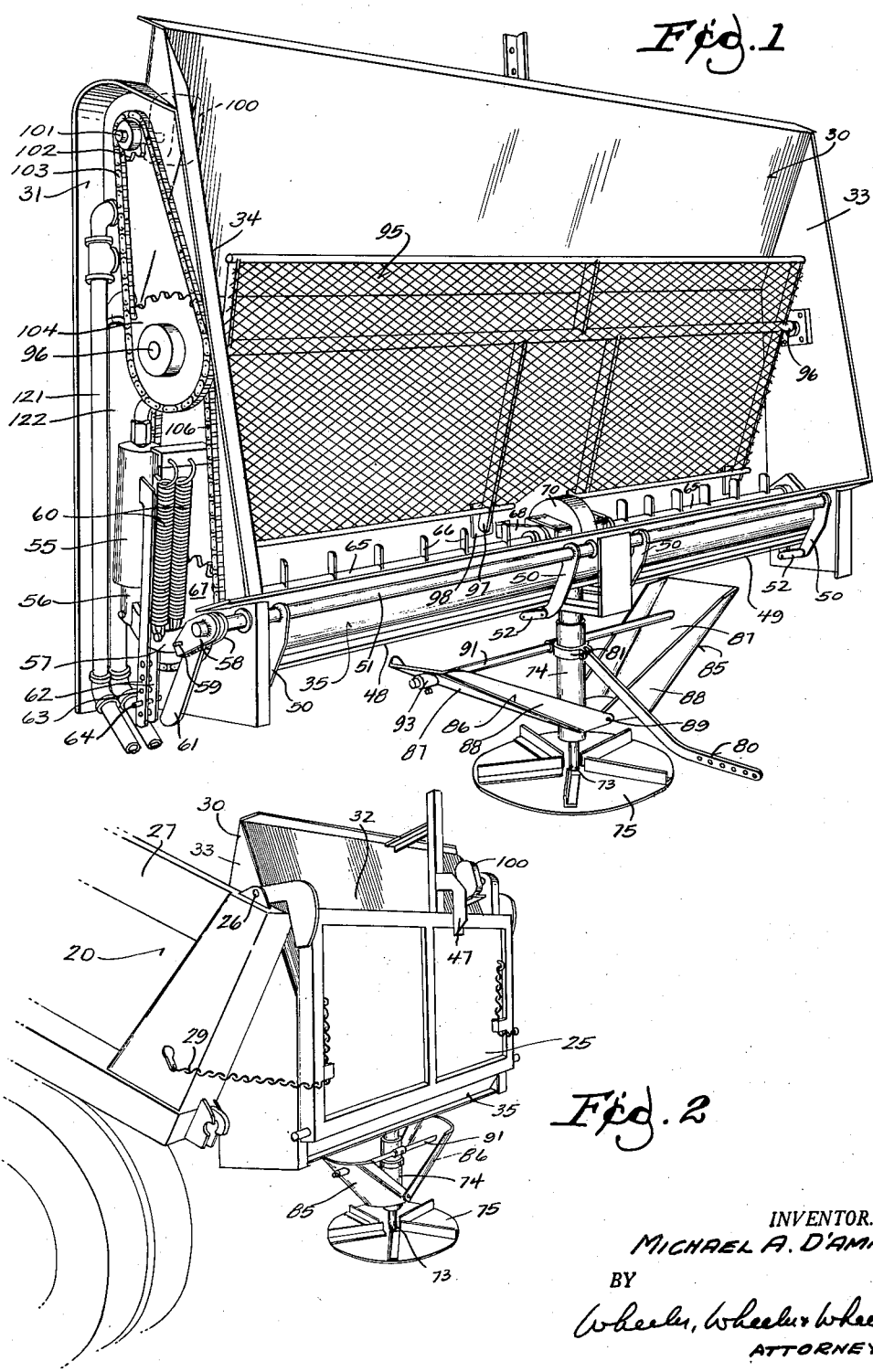

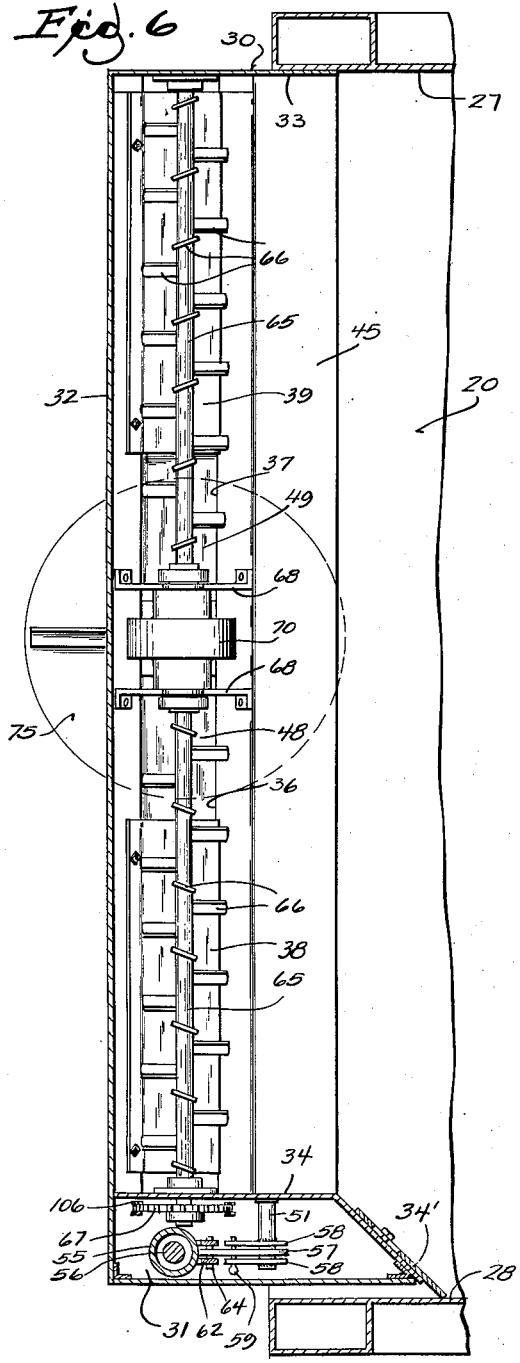
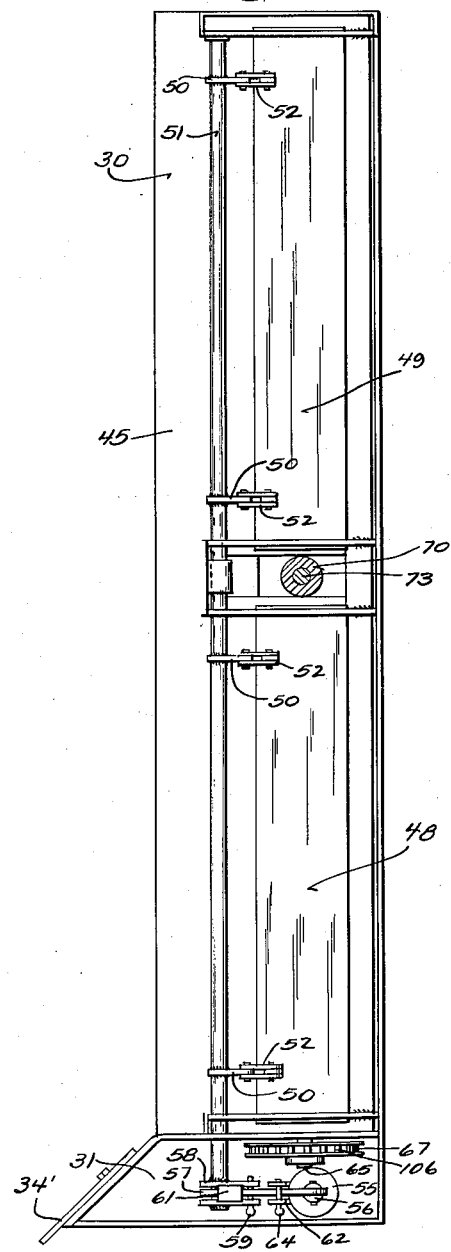

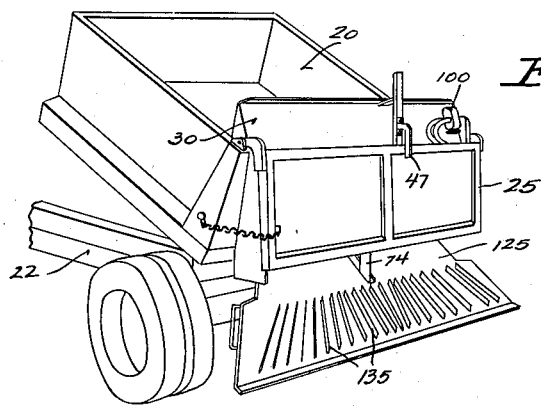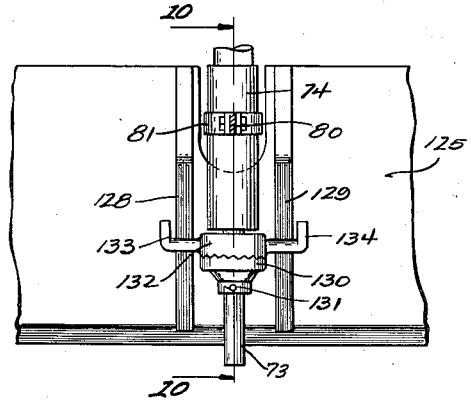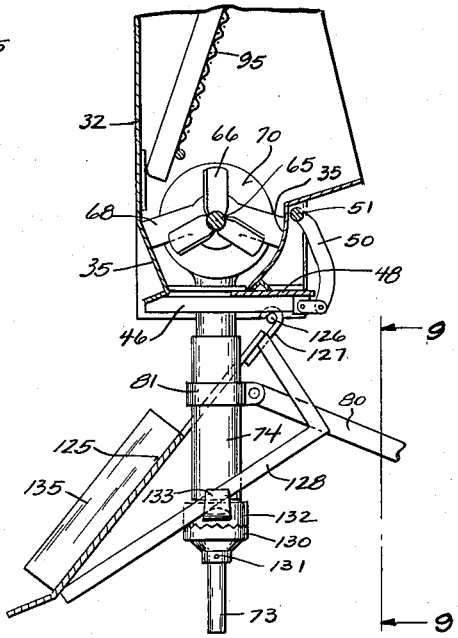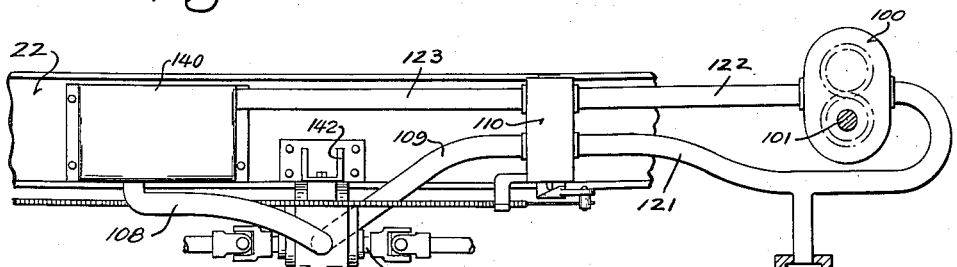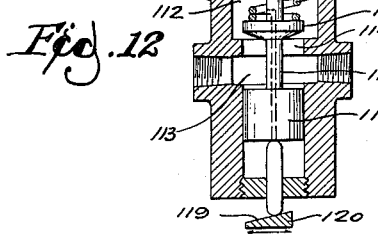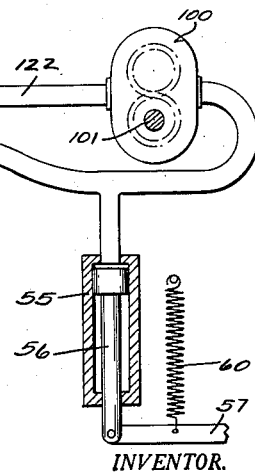

United States Patent Office 2,967,056
Patented Jan. 3, 1961

2,967,056
MATERIAL SPREADERS FOR DUMP TRUCKS

Michael A. D'Amato, Waukesha, Wis., assignor to Seaman-Andwall Corporation, Milwaukee, Wis., a corporation of Wisconsin Filed Oct. 28, 1955, Ser. No. 543,501
18 Claims. (Cl. 275—8)

My invention relates to material spreaders for dump trucks.

Dump truck bodies are quite standardized as to dimensions and tail gate equipment so that the material spreader of this invention is readily attachable to such a body, as a unitary piece of equipment, and since the power operated portions of the unit are motivated by its own hydraulic motor, it is only necessary to complete the hydraulic pressure connections to a novel valve control mechanism included in the invention and the unloading and spreading unit is ready for operation.

Important features of the invention include: unitary construction and shaping of the major parts for easy installation within and forwardly of the tail gate of a truck body; a screen surface material feeder to assure continuous, even feed of material from the truck body; a diverting tray to control and predetermine the directional spread of material by the plate-like spinner; a gate and actuator therefor to control quantitatively the outlet for material leaving the truck body; a vibrator mechanism and special spreader tray to be vibrated thereby, for delivery of certain types of materials; and a hydraulic system with control valve therefor to actuate the entire unitary attachment. Further features of the invention will be apparent from the following description.

In the drawings:

Fig. 1 is a perspective of the material spreader viewed from the front quarter, the cover of the actuating mechanism being removed.

Fig. 2 is a perspective of the material spreader as installed in the partially opened rear portion of a dump truck body, the view being taken at the left rear corner of the truck body.

Fig. 3 is a vertical section through the material spreader unit and the rear portion of the truck body and chassis with which the unit is attached, the section being taken on a line slightly to the right of the material spreader plate.

Fig. 4 is a section on line 4—4 of Fig. 3 certain of the parts being shown in elevation.

Fig. 5 is an elevation of the actuating mechanism shown at the left in Fig. 1.

Fig. 6 is a horizontal section on line 6—6 of Fig. 3.

Fig. 7 is a section on line 7—7 of Fig. 3.

Fig. 8 is a perspective of the right rear portion of a truck equipped with the material spreader but with the special vibrator tray in position to spread certain materials.

Fig. 9 is a rear elevation in enlarged detail showing the vibrator mechanism for the tray shown in Fig. 8 looking generally along line 9—9 of Fig. 10.

Fig. 10 is a vertical section on line 10—10 of Fig. 9.

Fig. 11 is a diagrammatic view of the pump, control valve, connections and motor devices for hydraulically actuating this material spreader.

Fig. 12 is a vertical section through the hydraulic control valve and actuating cam therefor.

In the following description the terms forward and rearward, and right and left, are used with reference to the truck in which this spreader is installed, and viewed by a person facing forwardly thereof.

As shown in Figs. 2, 3, and 8, the dump truck body 20 of the modern dump truck is supported upon hinge pins 21 carried by the rear ends of frame 22 forming part of chassis 23 of the truck. The truck body is hingedly swingable on these hinge pins from a position in which the floor 24 of the body is horizontal, to an upper position in which, as shown in Fig. 3, the floor is steeply tilted to slide the contents of the body rearwardly. The means for accomplishing this tilting operation are not shown since there are many different types of apparatus, hydraulic and mechanical, for this purpose.

At the rear of the truck body, a tail gate 25 mounted to swing on hinges 26 at the upper rear corners of side walls 27 and 28 is openable as shown clearly in Fig. 2. Some form of device such as chain 29 is provided to limit the angle to which the tail gate may be opened, and it is into the opening provided by a moderately opened tail gate that the material spreader of the instant invention is fitted so that material such as gravel, sliding rearwardly may be controllably delivered out of the rear of the body.

The largest structural element is a hopper-like, sheet metal, forwardly open box frame 30 of sufficient width so that there is space for an enclosure 31 for the operating mechanism described below, and the entire unitary construction is receivable between side walls 27—28 of the truck body. Plate 34' (Fig. 6) is adjustably mounted to the forward wall of the enclosure 31 to close any gap between the unit and the side wall of the truck body.

The rearward wall of the box frame 30 is shown at 32; the left and right walls are shown at 33—34 respectively; and the bottom is trough shaped as shown most clearly at 35 in Figs. 3 and 10. The bottom of the trough 35 is not open throughout the width of the box frame, but provides gate controlled openings at 36—37 (see Fig. 4) demarked by shelves 38 and 39. These shelves may be removed to obtain full width opening when used with a wide tray as described below.

When the tail gate is opened to provide an eleven inch opening at the bottom of the rear end of the floor 24, the trough portion of the box 30 substantially closes this eleven inch opening and a forwardly directed lip 45 of the trough "rides" on the floor 24 to scoop the material into the trough as the material slides backwardly over the floor. The downward movement of the hopper-like box frame is limited by the lip 45. Hook 47 prevents forward movement of the top of the unit. Hook 47 is above center of gravity for easy crane pick up.

Below the shelves 38 and 39 and spaced therefrom are gate supports 46 upon which gates 48—49 may slide forwardly and backwardly to control the quantity of material permitted to pass through openings 36 and 37. The sliding movement of the gates is controlled by gate arms 50 and a gate arm rock shaft 51 to which the arms 50 are welded. The lower arm ends are connected to the gates by means of links 52 (see Figs. 1 and 3) so that a gate actuator at the right end of the shaft 51 and housed in the enclosure 31 is connected to the gates.

Included in the gate actuator apparatus is a hydraulic cylinder 55, ram 56 and an arcuate lever arm 57 freely oscillatable about the rock shaft 51 but positioned between two rock shaft plates 58 welded to the shaft so that an actuator pin 59 manually insertable through apertures in the plates and lever arm completes an actuator connection to hydraulically force the gates to opened position. Since the cylinder and ram constitute a single acting hydraulic unit, the gates are returned to closed position by a pair of tension springs 60 shown most clearly in Figs. 1 and 2. When pin 59 is removed, it is possible to manually actuate the rock shaft 51 by means of manual lever 61 welded to the under sides of plates 58. In fact, this lever and its welded connection to the plates provides a bridge between the plates and, therefore, an abutment against which arcuate lever 57 may press in a gate opening movement if the pin is not inserted in the apertures above referred to.

To limit the swing of arm 57 and, therefore to limit the opening of the gates, there are secured to the exterior of cylinder 55 two spaced bars 62 between which the arm 57 may slide. These bars are provided with holes as shown at 63 so that a pin 64 may be manually positioned to bridge the space between the bars and limit the swing of the arm 57 as will be clear from an examination of Fig. 1.

Thus as the ram 56 is thrust downwardly the arm 57 will oscillate shaft 51 for a gate opening operation, but as soon as the arm strikes the pin 64, the gates responsive to shaft 51 and gate arms 50 can open no farther.

Extending across the unit and approximately concentric with the trough is an auger feeder shaft 65 having lugs 66 comprising fragmentary sections of screw flights shaped to move truck body contents laterally toward the center of the trough. The right hand end of this shaft 65 extends through a bearing supported by the end 34 of the unit through which the shaft extends and there is a sprocket 67 on the end of shaft 65 within housing 31. Heavy braces at 68 support the shaft in appropriate bearings.

Centrally of the length of the shaft 65 there is a gear housing 70 within which is a ring gear 71 mounted to turn with the auger feeder shaft. Gear 71 is meshed with a pinion 72 on vertical spinner shaft 73 (see Figs. 3 and 4). This spinner shaft is carried in bearings supported by tubular spinner shaft bearing assembly 74 rigidly secured to and extending downwardly from gear housing 70. It is on this assembly and on this shaft 73 that the material throwing and spreading apparatus is mounted.

At the lower end of shaft 73 is a spinner disc 75 provided integrally with a heavy supporting collar 76 having a set screw 77 to assure a driving connection to the shaft. On the upper surface of the disc are radial throwing fins 78 shaped to centrifugally throw material which may be dropped through openings 36 and 37 when the gates 48 and 49 are opened.

It will be apparent from the description of spinner plate operation below that the shaft 73 must be approximately vertical and spinner disc 75 must be approximately horizontal during spreading operations. To assure this a stabilizer bar 80 is connected between tubular assembly 74 and the chassis 23 of the truck. The connections for this purpose include a circle clamp 81 around the tubular assembly, a pivot pin 82 at one end of bar 80, and an adjustable, and somewhat flexible connection at 83 at the forward end of the bar to provide what shall be termed a parallelogram mounting for the unit with reference to the truck. It will be noted that the rockable mounting of the unit in the rear portion of the truck body provides a first dimension between hinge pins 21 and the axis of shaft 51, and the stabilizer bar 80 provides a dimension closely approximating that first dimension between pin 82 and connection 83 so that as the truck body is tilted, the axis of shaft 73 remains substantially vertical.

Tubular assembly 74 also supports two diverting tray half sections 85 and 86 shaped as shown in Figs. 1 and 3 with relatively short bottoms 87 and relatively long, triangular side walls 88 having centrally extended tips which, as to the respective trays, extend toward each other and are joined pivotally at 89 and 90 as shown to permit of a wide range of relative adjustment as to pitch of the bottoms of the trays. The trays are carried by cross bar 91 slidably supported in a boss 92 forming part of the tubular assembly 74, and swivel bosses 93 with suitable set screws as shown are secured to the outer ends of the bottoms of the trays for sliding reception of the cross bar in a particular position of adjustment. Thus these trays can be adjusted on the cross bar 91 for any degree of tilt of the tray bottoms and also the pair of trays may be adjusted so that the opening between the tray bottoms will assume any desired position laterally above the spinner disc, for directional throwing of material by the disc as will be described below.

It will be noted that there is a broad area of screen surface 95 across the unit 30 supported above the trough 35 by an eccentrically mounted jiggle shaft 96. The mounting of the shaft and the screen is such that when the shaft rotates, the whole screen jiggles and oscillates so as to dislodge a cascade of material from the solid "arched" masses slipping rearwardly in the body of the truck. Of course, the pressure of the material rearwardly presses the screen and its frame 97 toward the tail gate and there are provided at 98 rub plates to protect the back wall 32 of the unit.

It has been found that a screen surface oscillated or jiggled as described above is most effective to maintain even feed of the materials which are usually granular in form. The screen which is best adapted for this purpose is made up of what is known in the trade as "expanded metal" and is of a type common in the plaster and masonry arts for reinforcing and lath purposes although other types of screen will be useful also. The size of the mesh of the screen used for this purpose is determined in part by the size of the aggregate materials to be fed by this material spreader. The openings in the screen are such as to pass a high percentage of the granules or gravel and rock particles.

Certain materials to be fed or spread by the unit 30 are not subject to centrifugal spreading action provided by a spreader plate such as that at 75. For instance, the usual sand surfacing material for metered quantities of top dressing for highways has been found to be best spread by apparatus now to be described.

The diverting trays 85 and 86 and their supporting cross bar 91 are removed; as is also the spreader disc 75. Instead of the diverting trays a wide tray 125 shaped as shown in Figs. 8, 9, and 10 is hooked to rod 126 which extends across the unit beneath the supports 46. Hooks 127 at spaced points along the upper margin of the tray 125 are used for this purpose. There are two angle frames 128 and 129 beneath the tray and spaced so that they are disposed one on each side of the tubular assembly 74. These angle frames are secured to the tray and act as stiffening frame members for the tray.

Upon spinner shaft 73, a cam collar 130 is secured by a set screw 131 at such a height as to support a somewhat similar, but freely revoluble cam collar 132 mounted on the shaft. Carried by collar 132 are a pair of dogs 133 and 134 sufficiently long to extend radially of the collar into abutment with the sloping surfaces of angle frames 128 and 129. The result of spinner shaft rotation is to jiggle and upwardly thump the frames and the tray so that material fed past gates 48—49 will be shaken and caused to be delivered in an even flow from the tray 125.

To obtain the widest spread of material, shelves or baffles 38 and 39 may be removed, and since there is a tendency for the flow to concentrate centrally of the trough, the motor 100 may be reversed by reversing the high and low pressure connections thereto, thus causing the shaft 65 to rotate in a direction such that the material to be spread is urged outwardly away from the center. This, coupled with a proper regulation of the opening of the gates enables the operator to make an effective wide and even spread of material upon and from the tray 125.

The upper surface of tray 125 is provided with spreader fins 135 as shown in Figs. 8 and 10.

Power operation of the various elements of the apparatus above described is motivated by a hydraulic motor 100 secured to the upper portion of end wall 34 of the unit 30. The shaft 101 of the motor 100 is provided, within housing 31, with sprocket 102. A chain 103 connects this sprocket with sprocket 104 on jiggle shaft 96. Likewise on shaft 96 is located a sprocket 105 connected by chain 106 with sprocket 67 on auger feeder shaft 65, and because feeder shaft 65 is geared to spinner shaft 73, this completes the power connection for rotating or vibrating the parts during operation of the unit.

Liquid under pressure to operate motor 100 and to operate cylinder and ram 55—56 is supplied by a pump 141 secured to chassis cross member 142 where pump shaft 107 is in alignment with and connected to a power "take off" from the truck motor. A sump 140 for liquid storage and supply is carried by frame 22 and a low pressure liquid supply line 108 extends from the sump to the pump. High pressure line 109 extends to valve 110 which is an important and simplified control device for power and speed control of the material spreader.

Fig. 12 shows the valve construction. This includes a housing 111 in which there is a low pressure chamber 112 and a high pressure chamber 113 between which there is a valve controlled port 114. A valve 115 is mounted on stem 116 and provided with balancing piston 117 so as to control port 114 which is normally closed by compression spring 118, but the stem extends beyond the housing in position to be acted upon by a cam surface 119 of a cam lever 120 swingable in the direction indicated by the arrows.

Therefore the liquid under high pressure entering the high pressure chamber 113 is available to pass through the valve into conduit 121 for supply to motor 100 and to cylinder 55. From these motor devices the liquid is returned through low pressure conduit 122 to the low pressure chamber of the valve 110. There is a low pressure conduit 123 for passage of liquid back to the sump.

Thus the full supply of liquid under high pressure as supplied by pump 141 is available to operate the motor 100 up to the pressure maintained by spring 118. Pressure in excess of that which the spring 118 will withstand is relieved by passage of liquid through the port 114, and if the compression of spring 118 is supplemented by cam action of lever 120, the high pressure in conduit 121 is lessened by relief of more fluid through port 114. Under such conditions the speed of the motor 100 may be reduced.

As indicated above, the entire unit is receivable between the side walls of a truck body and the lateral dimension is deliberately made undersize so as to allow for variations in truck body widths. When the unit is to be installed in a truck body, the body is tilted as shown in Fig. 1. The tail gate 25 is permitted to swing open, but its chain 29 is set for an extreme bottom opening of eleven inches. The unit 30 is then lowered into position just forwardly of the tail gate with the back wall 32 against the tail gate and trough 35 extending down through the tail gate opening. Forward section of lip 45 will align itself with the floor 24 of the truck, thus limiting the downward adjustment of the unit. Hook 47 will engage the top margin of the tail gate to prevent forward displacement of the unit. When stabilizing bar 80 has been secured at 83 in proper adjustment for vertical disposition of shaft 73, the unit is in place for operation.

As soon as a load of material to be spread has been placed in the body of the truck, the spreading and delivery may commence at any time that the pump 141 is placed in operation by activation of the power take off shaft 107.

Cam lever 120 will be moved to the left as seen in Fig. 12 and high pressure liquid will not only start the motor 100 but will actuate the ram 56 to force the gates 48 and 49 to open. Any tendency of the material to arch or cake will be overcome by the lugs 66, which are so shaped as to agitate and feed the material toward the openings 36 and 37. At the same time the screen 95 will scratch, agitate and displace material in a most effective way since it has been discovered that a screen surface such as that described above is most effective— far more effective in fact than conveyor slats or any other agitator elements.

The material fed through the openings 36 and 37 drops on the diverting trays and passes by gravity to the spinner disc 75 from which it is thrown centrifugally by the radial fins. If the opening between the floors of the diverting trays is located so as to drop material centrally of the spinner disc 75, there will be an even distribution forwardly, backwardly and radially, but if the diverting trays drop material only at one side of shaft 73, it is possible to cascade the material in one direction at the will of the operator. This is accomplished by sliding the diverting trays on the diverting tray cross bar 91 as described above.

I claim:

1. A material spreader having means for feeding material to a centrifugal spreader, a spinner plate mounted foor centrifugal action with respect to material fed to it, and an adjustable diverting tray between said means and said spinner plate whereby to directionally divert material to any selected portion of the plate.

2. The spreader of claim 1 in which the plate is provided with a spinner shaft and tubular assembly therefor, said diverting tray being mounted to said assembly.

3. The spreader of claim 1 wherein the plate is provided with a spinner shaft and tubular assembly therefor having a tray supporting cross bar, the diverting tray being formed in two parts articulately joined with a material delivery opening therebetween and said parts are each adjustably connected to said bar.

4. A material spreader for installation between a dump truck body tiltable to move body contents toward a delivery opening at the end of the body and a tailgate therefor, said spreader including a frame, a broad surfaced foraminous member mounted on and spaced from said frame for passage of said body contents between said member and said frame, said member being mounted above said material opening in position to have its broad surface receive quantities of said contents thereagainst for passage therethrough, a mounting for said member including means for oscillating the surface of said member and means in communication with said opening in said frame for spreading said contents.

5. The spreader of claim 4 wherein the mounting for the member includes a revolvable shaft having eccentric bearing supports on said frame, said member being mounted to the shaft.

6. A material spreader having an open faced box frame receivable in the delivery end of a tiltable truck body in position to offer the open face toward body contents moved thereagainst by the inclination of the tiltable truck body, a trough shaped lower portion of said box frame at the lower margin thereof, said trough having a gate equipped opening for delivery of said contents, the gate therefor being normally biased to closed position, a gate arm attached to said gate, said arm being provided with a gate arm operating shaft including a lever, a hydraulic cylinder having a ram connected to said lever for opening the gate, control means remote from said hydraulic cylinder to control its operation, and means in communication with said gate equipped opening for spreading said contents.

7. The spreader of claim 6 wherein the trough is provided with a shaft having contents moving means thereon and hydraulic motor therefor, said motor and hydraulic cylinder having common liquid pressure means for operation thereof whereby upon light load conditions for the contents moving shaft the motor will speed up and the pressure will be lowered whereby to permit the gate to move toward closed position.

8. For insertion between the body of a dump truck and its top hinged tail gate, a unitary material spreader shaped to abut the tail gate in position to receive body contents and deliver them below the tail gate, said unitary spreader having a box shaped frame having an open front faced in the direction of material contents in the truck body and having a forwardly directed lip at its lower margin, a foraminous screen in the box frame forming an abutment against which material contents may lodge in the movement of the contents into the box, means for agitating the screen mounted in the unit to dislodge said material contents for passage thereof through said screen and means below said tailgate and affixed to said spreader for spreading said body contents.

9. In a hydraulically operated material spreader, a hydraulic conduit circuit having a pump, a sump, a low pressure supply conduit interconnecting said pump and said sump, a motor, a gate controlling cylinder, and a high pressure conduit interconnecting said pump with said motor and said gate controlling cylinder, and a valve in the high pressure conduit biased to closed position whereby to establish a predetermined limit of hydraulic pressure in the high pressure conduit, the motor having an output shaft connected to an auger feed shaft and a screen shaft positioned in the spreader, the cylinder being connected to a gate to control positioning thereof in accordance with fluid pressure in the high pressure conduit.

10. In a material spreader as set forth in claim 6, a vertically disposed power shaft, a tray in position to receive material to be spread, an angle frame secured to the tray and positioned adjacent said shaft, and a cam surface mounted for movement with the shaft in position to contact the frame whereby movement of the shaft causes the tray to vibrate.

11. The material spreader of claim 10 wherein the spreader includes a trough, openings beneath the trough for passage of material to the tray, connections between the trough and tray for pendular support of the tray therebeneath, said angle frame comprising a support in contact with the cam surface to position the tray at an angle to the natural pendular position of the tray whereby motion of the shaft causes the tray to vibrate.

12. The spreader of claim 11 wherein the tray has a pair of said angle frames one on each side of said shaft and the cam surface has lugs for angle frame contact.

13. For insertion in a body of a dump truck having a tail gate opening and a top hinged tail gate therefor, a unitary material spreader shaped to abut the tail gate interiorly of the truck body in position to receive body contents moving toward the tail gate in said body and provided with means for delivery of said contents through the open tail gate and means for dispersion of said contents, said means for dispersion of said contents comprising a spinner plate mounted on said spreader and below said open tail gate for centrifugal action with respect to material fed to it, a spinner shaft connected to said plate, a tubular assembly on said shaft, a tray supporting cross bar on said tubular assembly, and an adjustable diverting tray formed in two parts articulately joined to each other with a material delivery opening therebetween and over said spinner plate, said parts being each adjustably connected to said bar.

14. In a material spreader as set forth in claim 6, a power shaft, openings beneath the trough for passage of material, a tray in position to receive material to be spread through said openings, connections between the trough and tray for pendular support of the tray therebeneath, a cam surface mounted for movement with the shaft, a pair of angle frames on said tray, an angle frame on each side of said shaft, and lugs on said cam surface for engagement with said angle frames whereby motion of said shaft will vibrate said tray.

15. A material spreader for installation in a truck body tiltable to move body contents toward a delivery opening at the end of the body, said spreader including a frame, a broad surfaced foraminous screen mounted on said frame above said opening in position to have its broad surface receive quantities of said contents thereagainst for passage therethrough, a mounting for said screen including means for jiggling the screen, a spinner plate mounted on said frame below said opening for centrifugal action with respect to material fed to it, an adjustable diverting tray between said opening and said spinner plate, and means to adjust said diverting tray.

16. In a material spreader as set forth in claim 6, for installation in a truck body tiltable to move body contents toward a delivery opening at the end of the body, said spreader including a broad surfaced foraminous screen mounted on said frame above said opening in position to have its broad surface receive quantities of said contents thereagainst for passage therethrough, a mounting for said member including means for jiggling the surface of said screen, a power shaft, a tray mounted on said frame below said opening in position to receive material to be spread, means to deliver material from said member to said tray through said opening, an angle frame secured to the tray and positioned adjacent to said shaft, and a cam surface mounted for movement with the shaft in position to contact the angle frame whereby movement of the shaft will vibrate the tray.

17. In a material spreader as set forth in claim 6, means including power driven elements to receive said contents and spread the same, said last mentioned means comprising a tray, a vertically disposed power driven shaft, and means coupling said shaft to said tray to vibrate said tray.

18. In a hydraulically operated material spreader, a hydraulic conduit circuit having a pump, a sump, a low pressure supply conduit interconnecting said pump and said sump, a motor, a gate controlling cylinder, and a high pressure conduit interconnecting said pump with said motor and said gate controlling cylinder, and a valve in the high pressure conduit biased to closed position whereby to establish a predetermined limit of hydraulic pressure in the high pressure conduit, the motor having an output shaft connected to an auger feed shaft and a screen shaft positioned in the spreader, the cylinder being connected to a gate to control positioning thereof in accordance with fluid pressure in the high pressure conduit, and means in communication with said gate for spreading the contents of said material spreader.

References Cited in the file of this patent

UNITED STATES PATENTS

| 11,609 | Hockman | Aug. 29, 1854 |
| 1,050,165 | Pence | Jan. 14, 1913 |
| 1,120,021 | Burton | Dec. 8, 1914 |
| 1,312,226 | Bangert | Aug. 5, 1919 |
| 1,563,202 | Lentz | Nov. 24, 1925 |
| 1,814,488 | Murnahan | July 14, 1931 |
| 1,999,083 | Burchett | Apr. 23, 1935 |
| 2,006,473 | Naber | July 2, 1935 |
| 2,011,340 | Lundy | Aug. 13, 1935 |
| 2,018,609 | Dull et al. | Oct. 22, 1935 |
| 2,025,184 | Twose | Dec. 24, 1935 |
| 2,317,853 | Gaddis | Apr. 27, 1943 |
| 2,359,412 | Flink | Oct. 3, 1944 |
| 2,401,913 | Dawson | June 11, 1946 |
| 2,421,211 | Lutz | May 27, 1947 |
| 2,484,325 | Wachter | Oct. 11, 1949 |
| 2,645,522 | Kerser | July 14, 1953 |
| 2,697,609 | Chase et al. | Dec. 21, 1954 |
| 2,698,184 | Bowen | Dec. 28, 1954 |
| 2,717,783 | Flink | Sept. 13, 1955 |
| 2,827,205 | De Biasi | Mar. 18, 1958 |

FOREIGN PATENTS

| 15,773 | Great Britain | of 1897 |
| 22,018 | Great Britain | of 1907 |
| 295,960 | Great Britain | Aug. 20, 1928 |
| 70,202 | Sweden | Sept. 16, 1930 |
| 121,083 | Sweden | Mar. 9, 1948 |
| 142,450 | Sweden | Oct. 13, 1953 |

UNITED STATES PATENT OFFICE
CERTIFICATION OF CORRECTION

Patent No. 2,967,056 January 3, 1961

Michael A. D'Amato

It is hereby certified that error appears in the above numbered patent requiring correction and that the said Letters Patent should read as corrected below.

Column 6, line 20, for "foor" read -- for --; line 36, after "frame," insert -- a material opening in said frame --.

Signed and sealed this 23rd day of May 1961.

(SEAL)
Attest:

ERNEST W. SWIDER　　　　　　　　　　　　DAVID L. LADD
Attesting Officer　　　　　　　　　　　　　　Commissioner of Patents